US005726275A

United States Patent [19]
Bannenberg-Wiggers et al.

[11] Patent Number: 5,726,275
[45] Date of Patent: Mar. 10, 1998

[54] PROCESS FOR THE BATCHWISE PREPARATION OF POLY-P-PHENYLENE TEREPHTHALAMIDE

[75] Inventors: Angelica Elizabeth-Maria Bannenberg-Wiggers, Loenen; Johannes A. van Omme, Elst; Joannes Marinus Surquin, Arnhem, all of Netherlands

[73] Assignee: Akzo Nobel N.V., Netherlands

[21] Appl. No.: 682,795

[22] PCT Filed: Feb. 9, 1995

[86] PCT No.: PCT/EP95/00487

§ 371 Date: Jul. 31, 1996

§ 102(e) Date: Jul. 31, 1996

[87] PCT Pub. No.: WO95/21883

PCT Pub. Date: Aug. 17, 1995

[30] Foreign Application Priority Data

Feb. 11, 1994 [NL] Netherlands .................. 9400223

[51] Int. Cl.$^6$ .................................................. C08G 63/06
[52] U.S. Cl. .......................... 528/208; 528/176; 528/182; 528/207
[58] Field of Search ........................... 528/176, 182, 528/207, 208

[56] References Cited

U.S. PATENT DOCUMENTS

| | | | |
|---|---|---|---|
| 4,057,536 | 11/1977 | Jones, Jr. ............................ | 528/176 |
| 4,308,374 | 12/1981 | Vollbracht et al. .................. | 528/336 |
| 4,579,895 | 4/1986 | Cuidard et al. ...................... | 524/104 |
| 4,863,991 | 9/1989 | Poppe et al. ......................... | 524/606 |

FOREIGN PATENT DOCUMENTS

| | | | |
|---|---|---|---|
| 55190 | 6/1982 | European Pat. Off. ......... | D01F 6/60 |
| 157327 | 8/1976 | Netherlands .................... | C08G 69/32 |

OTHER PUBLICATIONS

Derwent Patent Abstract 68709B/38 (1979), abstracting JP 54/100,496.

Patent Abstracts of Japan, vol. 10, No. 314 (C-380), Oct. 1986, abstracting JP 61/123,632.

Patent Abstracts of Japan vol. 12, No. 172 (C-497), May 1988, abstracting JP 62/280,223.

*Primary Examiner*—Terressa Mosley
*Attorney, Agent, or Firm*—Richard P. Fennelly; Louis A. Morris

[57] ABSTRACT

Process for the batchwise preparation of poly-p-phenylene terephthalamide polymer by means of reacting approximately equimolar amounts of p-phenylene diamine and terephthaloyl dichloride in a solution containing N-methyl-2-pyrrolidone and calcium chloride, with the reaction being carried out in a cylindrical reaction vessel equipped with a single mixing gear used as stirrer and granulator, the contents of the reaction vessel being whirlingly mixed as terephthaloyl dichloride is added, the formed polymer being crumbled, and the reaction and the crumbling taking place in one and the same reaction vessel. The whirling mixing ensures that the terephthaloyl dichloride is very thoroughly mixed into the solution of N-methyl-2-pyrrolidone, calcium chloride, and p-phenylene diamine before the reaction between the reactants causes a very rapid increase in viscosity. The quality of She product obtained by this process is very high.

11 Claims, No Drawings

PROCESS FOR THE BATCHWISE PREPARATION OF POLY-P-PHENYLENE TEREPHTHALAMIDE

The invention pertains to a process for the batchwise preparation of poly-p-phenylene terephthalamide polymer by means of reacting approximately equimolar amounts of p-phenylene diamine and terephthaloyl dichloride in a solution containing N-methyl-2-pyrrolidone and calcium chloride.

Such a process is well-known. For instance, Netherlands patent specification NL 157327 describes the preparation of PPTA in a solution of NMP and calcium chloride. However, this patent specification makes no mention of any process by which the batchwise preparation of PPTA can be performed economically, optionally via upscaling. For, the scale on which PPTA is prepared in the examples of said patent specification is too small for economical preparation, and the preparative processes mentioned are not suitable for upscaling.

Neither do other prior art documents teach such a process. Thus, also EP 55 190 (U.S. Pat. No. 4,579,895) makes reference to the batchwise preparation of poly-p-phenylene terephthalamide. This reference, however, is by merely mentioning that the polycondensation of p-phenylene diamine and terephthaloyl dichloride can be carried through in a discontinuous or in a continuous process. Also other background disclosures pertaining to the preparation of poly-p-phenylene terephthalamide do not teach economically feasible batch processes. In *Patent Abstracts of Japan*, vol. 012, no.172 (C-497) JP 62/280223 is summarized as pertaining to the polymerization of p-phenylene diamine and terephtaloyl chloride in a specific solvent system, in order to achieve a high degree of polymerization. A similar disclosure, using a different solvent system, is JP 61/123632, summarized in *Patent Abstracts of Japan*, vol. 010, no. 314 (C-380).

The invention pertains to a process by which PPTA can be prepared economically on a commercial scale.

The invention consists in that in a preparation of the type described in the opening paragraph the reaction is carried out in a cylindrical reaction vessel equipped with a single mixing gear used as stirrer and granulator, the contents of the reaction vessel are whirlingly mixed as terephthaloyl dichloride is added, the formed polymer is crumbled, and the reaction and the crumbling take place in one and the same reaction vessel. The minimum rate of rotation required for whirling mixing is set immediately prior to the start of TDC metering. This rate of rotation will either be maintained during TDC metering, or it can be increased during the metering. The latter course, however, is not required. This minimum rate of rotation is the stirrer and granulator speed required to ensure even distribution over the cylindrical wall of the mixing vessel of all of the liquid in the reaction vessel, such that there will be virtually complete covering of the cylindrical wall by the liquid present in the vessel. In this process the mixing members move through the ring of liquid and pass very closely in front of the walls of the reaction vessel. It is assumed that the required proper mixing of the TDC into the liquid results not just from the movement of the mixing members through the liquid, but also from the whirling motions occurring in the liquid immediately behind the mixing members.

In this context a single mixing gear used as stirrer and granulator refers to a mixing gear comprised of members which can be employed for both stirring and granulating. Hereinafter such a mixing gear will also be referred to by the term "mixing mill."

According to a suitable embodiment of the process for preparing PPTA according to the invention, NMP and calcium chloride are charged to the reaction vessel and then thoroughly mixed, or else the NMP and the calcium chloride are mixed outside the vessel and the mixture is then charged to the reaction vessel. Next, PPD is added to this mixture in the reaction vessel, and the whole is thoroughly mixed. Alternatively, these three components can be charged to the reaction vessel in a different order, but this is attended with a number of practical drawbacks. One eminently practical method consists in that the NMP, calcium chloride, and PPD are mixed outside the reaction vessel, and the formed slurry or solution is then charged to the reaction vessel. Preferably, the thus obtained contents of the reaction vessel are cooled down as far as is possible without reducing the temperature to the point where the reactants on the wall of the vessel will precipitate. The temperature to be selected is dependent on the recipe used. After the thus obtained contents of the reaction vessel have been cooled down, preferably to a temperature below about 25° C., more preferably to a temperature from 0° to 10° C., and while the contents of the reaction vessel are whirlingly mixed, TDC is added. During the metering of the TDC, and also after all of the TDC has been added, the temperature in the reaction vessel rises, and there is a very rapid increase in the viscosity of the mixture in the reaction vessel. Over a short period of time the consistency of the contents of the reaction vessel changes from a liquid to a stiff gel. Continuing the mixing causes the reaction mixture to crumble. To prevent degradation of the formed polymer and corrosion of the equipment, it is preferred to cool the contents of the reaction vessel in order to keep their temperature below about 90° C., preferably below about 70° C. Such cooling may take the form of the wall of the reaction vessel being cooled in a generally known manner.

Depending on the quality of the starting products and the desired viscosity of the PPTA formed, the reaction vessel may be emptied once the reaction is as good as complete. In many instances the vessel may be emptied within 15 minutes of the final TDC addition, even within 10 minutes thereof or less. If the period between the completion of the TDC addition and the emptying of the reactor is prolonged, PPTA polymer of a higher viscosity can be obtained. Alternatively, a polymer having a higher viscosity can be obtained by enhancing the purity of the starting products. By proper mixing of the mass removed from the reaction vessel with water, a basic solution or some other appropriate medium, PPTA can be isolated from the thus formed suspension by means of filtration. The resulting PPTA can be further purified by washing.

To obtain PPTA having passable or good viscosity it is necessary to employ a sufficient amount of calcium chloride. PPTA of passable quality requires the use of at least 4.5 weight %, calculated on the quantity by weight of NMP, but in actual practice the calcium is likely to be used in amounts of at least about 5 wt. %, preferably of between 8 and 24 wt. %. Depending on the employed amount and the temperature, the calcium chloride may be dissolved completely in NMP, or it may be present in the mixture partially in the dissolved state and partially in the suspended state. To achieve a satisfactory reaction between the reactants, the calcium chloride preferably is present in the dissolved state. A very suitable method consists in that all of the calcium chloride is dissolved in NMP prior to the addition of the reactants. To simplify the dissolution process it is preferred that calcium chloride be mixed with the NMP in the particulate form.

Use is made of equimolar amounts of PPD and TDC, optionally with a very slight excess of either of the two. The amounts of PPD and TDC employed in the preparation of PPTA according to the invention are dependent on the desired concentration of the PPTA to be prepared. Low concentrations, i.e., concentrations of less than about 9 wt. %, calculated on the amount of NMP, are unattractive from an economical point of view and give practical problems when it comes to handling the reaction product. Very high concentrations, i.e., concentrations of more than about 20 wt. %, generally result in low inherent viscosity values. Preferably, the amounts of PPD and TDC are selected such that on conclusion of the reaction there will be 7 to about 20 wt. % of polymer, calculated on the NMP. Very favourable results are attained if the monomer is employed in such an amount as will give polymer concentrations on conclusion of the reaction in the range of about 8 to 15 wt. %.

In addition to the NMP a minute amount, e.g., up to 10%, of some other solvent may be present in the reaction vessel. Furthermore, substances may be added which are particularly known as acid-binding agents and are used in low-temperature polymerisations in a solvent to neutralise the hydrochloric acid formed during the polymerisation reaction, e.g., calcium oxide, pyridine, N-methyl morpholine, triethyl amine, N-methyl aniline, and N-N-dimethyl aniline. The substances or substance blends charged to the reaction vessel should contain as few impurities as possible and be anhydrous in as far as this is possible.

It was found that when preparing PPTA according to the invention, the feeding of TDC to the reaction mixture and the mixing of TDC into the reaction mixture have a very significant effect on the quality of the formed polymer, notably on its viscosity and molecular weight distribution. The quality of the mixing in particular determines to a very large extent the quality of the polymer to be formed. Since the reaction of PPD with TDC proceeds very rapidly, the TDC should be mixed into the reaction mixture homogeneously and as quickly as possible. In a single stirrer and granulator this can be achieved only by whirlingly mixing the reaction mixture during the TDC addition. In the case of whirling mixing the rate of rotation of the mixing mill is such that the liquid present prior to the feeding of the TDC will be evenly distributed over the cylindrical wall of the mixing vessel, and the liquid forms a ring on the wall of the reaction vessel, the axial rate of movement being such as will give the most rapid uniform distribution of this reaction component through the entire contents of the reaction vessel possible during the TDC metering. TDC may be metered in either the solid or the liquid form. Since it is easier to reproducibly meter liquid TDC than solid TDC, the metering of liquid TDC is preferred.

The TDC can be introduced into the reaction vessel in several places. If the introduction of TDC into the reaction vessel proceeds via different orifices, it is advisable to meter equal amounts of TDC per unit of time into the reaction vessel from every orifice. In consequence, it is easier, and preferable, to meter the TDC via a single orifice, which preferably is located in the cylindrical wall of the reaction vessel. In order to ensure that the mixing of the TDC into the reaction mixture is as homogeneous as possible, the location of this supply orifice should be selected such that no accumulation of TDC can occur in (part of) the reaction vessel. Moreover, it is advisable, as well as essential for very thorough mixing, that the configuration of the mixing mill be such as will not give any dead corners in the reaction vessel and ensure uniform mixing of the contents of the reaction vessel.

The period of time during which it is advisable to add all of the TDC in a single step is determined in particular by the increase in viscosity which occurs after the TDC addition and impedes the homogeneous mixing of TDC into the reaction mixture. If all of the TDC is added in one go, i.e., over an extremely short period of time, it will be virtually impossible to achieve homogeneous mixing. Hence, the TDC will always have to be metered if PPTA is to be obtained. The metered TDC reacts instantaneously and virtually completely with the PPD present. In consequence, there is a very rapid increase in dynamic viscosity, which makes it ever more difficult to distribute the TDC rapidly and homogeneously through the contents of the reaction vessel as the feeding progresses. It was found that the quality of the polymer is determined to a significant extent by the quality of the mixing of the last few per cent of TDC. For that reason it is preferred during the whirling mixing for all of the TDC to be added prior to the very rapid increase in dynamic viscosity. This can be determined from the power curve, in which the required power of the motor of the stirrer and granulator is plotted against time. The time within which preferably all of the TDC is added lies in advance of the point at which there is a sudden, strong increase in power.

By reducing the rate of increase in viscosity, e.g., by cooling the contents of the reaction vessel during TDC metering, this period can be extended and hence the mixing further improved. By whirling mixing according to the preferred embodiment virtually ideal mixing can still be achieved when the TDC is fed in a single step, even at high reaction temperatures and high monomer concentrations. It is preferred to add the TDC very evenly, preferably at a rate in the range of 4.5 to 72 kg per minute per $m^3$ of reaction vessel content.

Instead of being added in one go, the TDC can be added in two or more steps, with the contents of the reaction vessel being cooled down in between the different steps to a temperature in the range of 10° to 20° C., preferably to about 15° C. Also when the TDC is added stepwise, it is preferred that all of the TDC be added before there is a sudden, sharp increase in required power. It was found that such can always be achieved by 50% or more of the total amount of TDC to be added being metered in the final step. According to a method deemed to be very suitable, the TDC is added in two steps, with less than 50% of the total amount of TDC, say, about 30%, being fed in the first step, and the remaining amount of TDC being fed in the second step. In all cases, while there remains TDC to be added, such a rate of rotation of the stirrer and granulator is maintained as is required for whirling mixing.

After all of the TDC has been added, the rate of rotation of the stirrer and granulator may be reduced if so desired, so the contents of the reaction vessel will no longer be whirlingly mixed. This is not essential, but especially when the reaction is carried out in a reaction vessel with a large capacity, it may be advantageous from the point of view of processing technique. However, the rate of rotation of the mixing mill should always be sufficiently high to ensure crumbling of the reaction mixture.

Primarily indicative of the quality of the formed PPTA preferably is the relative viscosity, $\eta_{rel}$. Also indicative may be the width of the molecular weight distribution. Preference is given to it being as narrow as possible. $\eta_{rel}$ is defined as the viscosity ratio of a 0.25 wt. % PPTA solution in 96% sulphuric acid to the pure solvent (96% sulphuric acid). This ratio is determined with the aid of a capillary viscometer at 25° C. It was found that when preparing PPTA in the above-described manner, a change point is established for $\eta_{rel}$ when the PPTA is prepared at different rates of rotation of the mixing mill. At rates of rotation above this change point a ring of liquid is formed on the cylindrical wall of the reaction vessel prior to the addition to it of TDC, and the contents of the reaction vessel are whirlingly mixed. The value of $\eta_{rel}$ at which this change point is found to lie and, more generally, the value of the $\eta_{rel}$ of PPTA polymer prepared according to the invention, are dependent on a host of factors, including the quality of the monomers and the solvent quality.

It is preferred that the preparation of PPTA according to the invention be carried out in a reaction vessel having a measure of capacity exceeding 0.25 m$^3$, preferably exceeding 1 m$^3$, more particularly exceeding 2 m$^3$. In order to ensure optimal whirling mixing for the contents of the reaction vessel, it is desired that the degree of filling of the reaction vessel be at least 25% and not more than 70%, preferably at least 30% and not more than 60%. The term degree of filling in this context stands for one hundred times the quotient of the total volume of the individual components charged to the reaction vessel and the net measure of capacity of the reaction vessel. Highly favourable results are obtained when the mixing mill's installed power is at least 20 kW per m$^3$ measure of capacity of the reaction vessel.

It was found that the only reaction vessels suitable for the preparation of PPTA according to the invention are those in which the contents can be whirlingly mixed during the TDC metering. Such a reaction vessel will contain a mixing gear, e.g., a shaft equipped with mixing members, capable of properly mixing and stirring a low-viscous substance, e.g., a liquid, and crumbling a high-viscous substance, e.g., a gel. The power of the motor driving this mixing gear should be high enough to enable these processing steps to be carried out. The shape and the arrangement of the mixing members in particular are of importance when it comes to the serviceability of this reaction vessel for the preparation of PPTA according to the invention. While according to the present invention a second shaft with (different) mixing members may be provided, these do not actually contribute to the required stirring and granulating process. It was found that in order to carry out the process according to the preferred embodiments in the present invention, it is advisable to employ a cylindrical reaction vessel in which the contents are mixed in the axial as well as the radial direction. The movement in the axial direction in particular can be affected by the shape and the positioning of the mixing members. Since very high rates of rotation of the mixing mill will be maintained for the whirling mixing of the contents of the reaction vessel in a cylindrical reaction vessel which is not in a horizontal position, for the preparation of PPTA according to the invention the use of a horizontally positioned cylindrical reaction vessel is preferred.

It was found that a horizontal cylindrical paddle mixer is especially suitable for use as a reaction vessel for preparing PPTA according to the invention. Such a mixer contains a horizontally positioned cylindrical vessel with a shaft near to, and preferably on, the central axis of the cylinder, on which shaft mixing members are secured. This shaft equipped with mixing members can be used as stirrer and granulator. It was found that especially when this mixer is equipped with a shaft which has paddles as mixing members, the paddles being shaped and positioned such that all of the walls of the reaction vessel are scraped and it is possible to mix the contents of the reaction vessel in the axial as well as the radial direction, it can be used to whirlingly mix and homogenise the low-viscous mass present prior to polymerisation as well as the mass of higher viscosity present during polymerisation and the high-viscous mass present on conclusion of the polymerisation process. Furthermore, the high-viscous mass can be crumbled. An additional advantage consists in that such a reaction vessel can be emptied so completely as to do away with the need to clean it prior to the introduction of the next batch. During the whirling mixing process the paddles will move through the ring of liquid, causing the liquid to whirl. Preferably, the clearance between the mixing members and the wall of the reaction vessel is as narrow as possible.

A very suitable horizontal cylindrical paddle mixer for the preparation of PPTA according to the invention is the *Turbulent-Schellmischer mit Flügelmischwerk* made by Drais. This Drais mixer is equipped with a horizontal shaft with side pieces on which paddles are secured. These paddles are positioned in such a way as to give axial and radial mixing vis-à-vis the horizontal shaft. In this process the paddles pass very close to the wall. It is preferred that the clearance between the paddles and the cylindrical wall be less than 1% of the internal diameter of the reaction vessel. The position of the mixing blades makes the vessel self-discharging and all the walls are scraped. In order to mix the TDC into the reaction mixture as homogeneously as possible, it is advisable to meter it about halfway between the two ends of the reaction vessel, via its cylindrical wall. It was found that the rate of rotation of a Drais mixer at which the contents of the reaction vessel will be whirlingly mixed and the TDC homogeneously mixed into the reaction mixture depends, int. al., on the measure of capacity and the dimensions of the reactor. It was found that if the measure of capacity of the reactor is increased while its length/diameter ratio remains about the same, there is a decrease of the minimum rate of rotation of the mixing mill at which the contents of the reactor still can be whirlingly mixed. In spite of the lower rate of rotation the TDC is still mixed into the reaction mixture sufficiently homogeneously in this case. However, it was also found that if the measure of capacity of the reactor is increased solely by increasing the reactor length, and if polymer of good quality is desired, i.e., polymer not just of satisfactory viscosity but also with a narrow molecular weight distribution, then the rate of rotation of the mixing mill will have to be increased to ensure sufficiently rapid homogeneous mixing of the TDC into the reaction mixture, or the axial velocity will have to be raised in some other way, e.g., by altering the positioning of the mixing mill.

Preferably, the ratio of the length of the reaction vessel to its diameter, is more than about 1 and less than or equal to about 2. Given this notable change in consistency, it seems obvious when selecting a process for commercial scale polymerisation of PPTA to have it take place in several steps and using several types of mixers.

Such a process is described in the Japanese patent application published under no. JP 54/100496. However, the drawback to such a process is that in a series connection the polymerisation proceeds uncontrolled during the transfer from one apparatus to the next, and that in consequence it is impossible to produce polymer of a consistent quality. Hence it is not surprising that patent documents in which there is question of a description of polymerisation equipment for commercial scale production have opted for a continuous process. It was found that, in some aspects, batchwise preparation of PPTA according to the present invention is superior to continuous preparation. The equipment used in continuous preparation has to be comprised of components which will sufficiently mix and crumble the reaction mixture despite the major changes taking place in its viscosity. The equipment for the present batchwise preparation is notably simpler in terms of design than that for continuous preparation. Also, it was found that batchwise preparation could give a product with a narrower molecular weight distribution, characterised by the $M_w/M_n$ ratio. In the case of a continuous process there is question of the residence period in the equipment being widely varied, enabling a wider molecular weight distribution. Further, it was found to be possible to employ higher monomer concentrations in the batchwise process. The monomer concentration is defined as the quotient of the amount of PPD and TDC and the amount of PPD, TDC, and solvent, multiplied by 100%. Concentrations of 14–17% PPD may be used in the preparation according to the invention. Generally, the advantage of batchwise preparation of aromatic polymers over continuous preparation is that it permits easy production of products of different compositions.

The PPTA prepared by the process according to the invention and having a relative viscosity of more than 3.5, preferably of more than 4.3, is suitable for use as a raw material for making films, staple fibres, pulp, and continuous filament yarn of high strength and high modulus. Also, the polymer is highly suitable for use alone as reinforcing material. The products can be obtained by processing solutions of the polymer in concentrated sulphuric acid, e.g., by spinning. Yarns and fibres are very suitable for use as reinforcing material in rubber materials subjected to mechanical and dynamic load, such as car tires, V-belts, and conveyor belts. Pulp and staple fibres can be used, int. al., in insulation and clutch facings.

The invention will be further illustrated with reference to the following examples. All percentages are by weight and calculated on the quantity by weight of NMP, unless otherwise specified. In all of these examples the calcium chloride content in NMP is defined as the amount of calcium chloride per quantity of calcium chloride and NMP.

EXAMPLE 1A

For the preparation of PPTA according to the invention the reaction vessel used was a *Turbulent-Schnellmischer mit Flügelmischwerk* of Drais, a so-called Drais mixer, type T2500. This Drais mixer has a single mixing gear provided with six paddles. The mixer has a length/diameter ratio of about 1.2. The TDC supply orifice was positioned tangentially in the cylindrical wall of the mixer about halfway between the two mixer ends. The polymerisation reaction was carried out under the following conditions:

| | |
|---|---|
| calcium chloride content in NMP | ±11 wt. % |
| water content in CaCl$_2$/NMP | <100 ppm |
| mole ratio PPD/TDC | 0.999 |
| monomer concentration | 12.3 wt. % |
| degree of filling of the reaction vessel | 40% |
| starting temperature of the reaction | 5° C. |
| liquid TDC metering | |
| TDC metering time | ±120 sec |

TDC was charged to the reaction vessel at a rate of rotation of the mixing gear of 150 revolutions per minute (rpm). At a rate of rotation of 150 rpm, an even ring of liquid was formed on the cylindrical wall of the reaction vessel prior to the addition of the TDC. After 30 minutes a sample was taken from the reaction vessel. This sample was coagulated with water, and the resulting polymer was washed and dried. The relative viscosity ($\eta_{rel}$) of the polymer was measured. The measured viscosity value is listed in Table I.

EXAMPLE 1B

Under the same polymerisation conditions as mentioned in Example 1TDC was supplied at a rate of rotation of 100 rpm. At a rate of rotation of 100 rpm, an even ring of liquid was formed on the cylindrical wall of the reaction vessel prior to the addition of the TDC. A sample was taken and treated in the same manner as indicated in Example 1, and the $\eta_{rel}$ of the thus obtained polymer was measured. The measured viscosity value is listed in Table I.

EXAMPLE 1C (NOT ACCORDING TO THE INVENTION)

Under the same polymerisation conditions as mentioned in Example 1TDC was supplied at a rate of rotation of 75 rpm. At a rate of rotation of 75 rpm, there was no formation of an even ring of liquid on the cylindrical wall of the reaction vessel prior to the addition of the TDC. A sample was taken and treated in the same manner as indicated in Example 1, and the $\eta_{rel}$ of the thus obtained polymer was measured. The measured viscosity value is listed in Table I.

EXAMPLE 1D (NOT ACCORDING TO THE INVENTION)

Under the same polymerisation conditions as mentioned in Example 1 TDC was supplied at a rate of rotation of 50 rpm. At a rate of rotation of 50 rpm, there was no formation of an even ring of liquid on the cylindrical wall of the reaction vessel prior to the addition of the TDC. A sample was taken and treated in the same manner as indicated in Example 1, and the $\eta_{rel}$ of the thus obtained polymer was measured. The measured viscosity value is listed in Table I.

TABLE I

| Example | rate of rotation (rpm) | ηrel |
|---|---|---|
| 1A | 150 | 10,93 |
| 1B | 100 | 9,29 |
| 1C | 75 | 5,98 |
| 1D | 50 | 4,20 |

The above examples show that at a rate of rotation in the range of 75 to 100 rpm there is a rise in the measured viscosity value. This rise coincides with the observation that at a rate of rotation higher than or equal to 100 rpm an even ring of liquid will be formed on the cylindrical wall of the reaction vessel. These examples show that at a rate of rotation higher than 75 rpm whirling mixing can take place in the mixer employed.

EXAMPLE 2A

In a Drais mixer similar to that described in Example 1 PPTA was formed in a polymerisation reaction carried out under the following conditions:

| | |
|---|---|
| calcium chloride content NMP | ±11 wt. % |
| water content in CaCl$_2$/NMP | 200 ppm |
| mole ratio PPD/TDC | 0.999 |
| monomer concentration | 12.4 wt. % |
| rate of rotation during TDC metering | 150 rpm |
| rate of rotation after TDC metering | 150 rpm |
| degree of filling of the reaction vessel | 40% |
| starting temperature of the reaction | 5° C. |
| purity PPD and TDC | >99.9% |
| liquid TDC metering | |
| TDC metering time | ±120 sec |
| residence period in the reaction vessel | 190 sec |

Note: The residence period in the reaction vessel was measured from the start of the TDC metering.

At a rate of rotation of 150 rpm, an even ring of liquid was formed on the cylindrical wall of the reaction vessel prior to the addition of the TDC. After the residence period in the reaction vessel a sample was treated in the same manner as described in Example 1, and the $\eta_{rel}$ of the thus obtained polymer was measured. The measured viscosity value is listed in Table II.

EXAMPLE 2B

Example 2A was repeated, except that the polymerisation conditions were altered as follows:

| | |
|---|---|
| water content in CaCl$_2$/NMP | <100 ppm |
| rate of rotation after TDC metering | 140 rpm |
| residence period in the reaction vessel | 32 min |

At a rate of rotation of 150 rpm, an even ring of liquid was formed on the cylindrical wall of the reaction vessel prior to the addition of the TDC. After the residence period in the reaction vessel a sample was treated in the same manner as described in Example 1, and the $\eta_{rel}$ of the thus obtained polymer was measured. The measured viscosity value is listed in Table II.

EXAMPLE 2C

Example 3 was repeated, except that the polymerisation conditions were altered as follows:

| | |
|---|---|
| water content in CaCl$_2$/NMP | 400 ppm |
| rate of rotation during TDC metering | 145 rpm |
| rate of rotation after TDC metering | 100 rpm |
| degree of filling of the reaction vessel | 52% |

At a rate of rotation of 145 rpm, an even ring of liquid was formed on the cylindrical wall of the reaction vessel prior to the addition of the TDC. After the residence period in the reaction vessel a sample was treated in the same manner as described in Example 1, and the $\eta_{rel}$ of the thus obtained polymer was measured. The measured viscosity value is listed in Table II.

EXAMPLE 2D (NOT ACCORDING TO THE INVENTION)

Example 2A was repeated, except that the polymerisation conditions were altered as follows:

| | |
|---|---|
| water content in CaCl$_2$/NMP | 400 ppm |
| degree of filling of the reaction vessel | 20% |
| TDC metering time | 62 sec |
| residence period in the reaction vessel | 15 min |

At a rate of rotation of 150 rpm, there was no formation of an even ring of liquid on the cylindrical wall of the reaction vessel prior to the addition of the TDC. After the residence period in the reaction vessel a sample was treated in the same manner as described in Example 1, and the $\eta_{rel}$ of the thus obtained polymer was measured. The measured viscosity value is listed in Table II.

TABLE II

| Example | $\eta_{rel}$ |
|---|---|
| 2A | 6.6 |
| 2B | 19.9 |
| 2C | 4.6 |
| 2D | 3.1 |

These examples show that when preparing PPTA according to the invention

- it is possible to obtain polymer of sufficiently high viscosity in a short time (Example 2A)
- polymer having very high viscosity values can be obtained (Example 2B)
- it is possible to obtain polymer of sufficiently high viscosity even at a higher degree of filling of the reaction vessel (Example 2C).

Example 2D shows that when the degree of filling of the reactor is not high enough, no ring of liquid is formed, and it is not possible to obtain polymer of sufficiently high viscosity.

EXAMPLE 3

In a Drais mixer having a measure of capacity of 160 l, which is identical with the Drais mixer as described in Example 1 as regards the mixing gear, the length/diameter ratio, and the supply orifice for TDC, a polymerisation reaction was conducted under the following conditions:

| | |
|---|---|
| calcium chloride content NMP | ±11 wt. % |
| water content in CaCl$_2$/NMP | <100 ppm |
| mole ratio PPD/TDC | 0.999 |
| monomer concentration | 17.9 wt. % |
| rate of rotation during TDC metering | 190 rpm |
| rate of rotation after TDC metering | 190 rpm |
| degree of filling of the reaction vessel | 43% |
| two-step solid TDC metering | |
| ratio 1$^{st}$/2$^{nd}$ step | 30/70 |
| starting temperature 1$^{st}$ step | 5° C. |
| starting temperature 2$^{nd}$ step | 15° C. |
| residence period in the reaction vessel | 32 min |

Prior to the addition of the reactants all calcium chloride was dissolved in NMP. At a rate of rotation of 150 rpm, an even ring of liquid was formed on the cylindrical wall of the reaction vessel prior to the addition of the TDC. After the residence period in the reaction vessel a sample was treated in the same manner as described in Example 1, and the $\eta_{rel}$ of the thus obtained polymer was measured. A viscosity value of 5.1 was measured.

EXAMPLE 4A

For the preparation of PPTA according to the invention the reaction vessel used was a Drais mixer, type T4000. This Drais mixer has a single mixing gear provided with eight paddles. The mixer has a length/diameter ratio of about 2. The supply orifice for TDC was situated in the cylindrical wall of the mixer, about halfway between its two ends. The polymerisation reaction was carried out under the following conditions:

| | |
|---|---|
| calcium chloride content NMP | ±10.5 wt. % |
| water content in CaCl$_2$/NMP | ±675 ppm |

| | |
|---|---|
| mole ratio PPD/TDC | 0.997 |
| monomer concentration | 11.2 wt. % |
| rate of rotation during TDC metering | 197 rpm |
| rate of rotation after TDC metering | 150 rpm |
| degree of filling of the reaction vessel | 43.7% |
| starting temperature of the reaction liquid TDC metering | ±15° C. |
| TDC metering time | ±120 sec |
| residence period in the reaction vessel | 7 min |

At a rate of rotation of 197 rpm, an even ring of liquid was formed on the cylindrical wall of the reaction vessel prior to the metering of the TDC. After the residence period in the reaction vessel a sample was treated in the same manner as described in Example 1, and the $\eta_{rel}$ of the formed polymer was measured. The measured viscosity value is listed in Table III.

EXAMPLE 4B

Example 4A was repeated, with the water content of the used CaCl$_2$/NMP amounting to 350 ppm. At a rate of rotation of 197 rpm, an even ring of liquid was formed on the cylindrical wall of the reaction vessel prior to the metering of the TDC. After the residence period in the reaction vessel a sample was treated in the same manner as described in Example 1A, and the $\eta_{rel}$ of the formed polymer was measured. The measured viscosity value is listed in Table III.

TABLE III

| Example | $\eta$rel |
|---|---|
| 4A | 4.3 |
| 4B | 5.6 |

Examples 4A and 4B show that large-scale preparation of PPTA polymer is possible according to the invention (the measure of capacity of the reaction vessel is 4 m$^3$). In addition, these examples demonstrate that the $\eta_{rel}$ level of the obtained PPTA is dependent on the quality of the solvent employed.

EXAMPLE 5

In a Drais mixer having a measure of capacity of 160 l, which is identical with the Drais mixer as described in Example 1 as regards the mixing gear, the length/diameter ratio, and the supply orifice for TDC, a polymerisation reaction was conducted under the following conditions:

| | |
|---|---|
| calcium chloride content NMP | ±11 wt. % |
| water content in CaCl$_2$/NMP | <100 ppm |
| mole ratio PPD/TDC | 0.999 |
| monomer concentration | 12.2 wt. % |
| rate of rotation during TDC metering | 150 rpm |
| rate of rotation after TDC metering | 60 rpm |
| degree of filling of the reaction vessel one-step solid TDC metering | 75% |
| starting temperature reaction | 5° C. |
| residence period in the reaction vessel | 16 min |

Prior to the addition of the reactants all calcium chloride was dissolved in NMP. After the residence period in the reaction vessel a sample was treated in the same manner as described in Example 1, and the $\eta_{rel}$ of the thus obtained polymer was measured. A viscosity value of 18.4 was measured. This shows that the process of the invention makes it possible to economically produce PPTA of high quality.

We claim:

1. A process for the batchwise preparation of poly-p-phenylene terephthalamide polymer by reacting about equimolar amounts of p-phenylene diamine and terephthaloyl dichloride in a solution containing N-methyl-2-pyrrolidone and calcium chloride, characterized in that the reaction is carried out in a cylindrical reaction vessel having a measure of capacity of at least 160 liters which is equipped with a single mixing gear used as stirrer and granulator, the contents of the reaction vessel are whirlingly mixed, as terephthaloyl dichloride is added, the formed polymer is crumbled, and the reaction and the crumbling take place in one and the same reaction vessel.

2. A process according to claim 1, characterised in that all of the terephthaloyl dichloride is added to the solution prior to the sharp increase in required power of the motor of the stirrer and granulator.

3. A process according to claim 1, characterised in that the preparation is carried out in a reaction vessel having a measure of capacity of at least 0.25 m$^3$.

4. A process according to any one of the preceding claims, characterised in that a shaft of the stirrer and granulator in the reaction vessel is equipped with members ensuring both axial and radial mixing vis-à-vis the shaft.

5. A process according to claim 4, characterised in that the members on the shaft of the stirrer and granulator are paddles.

6. A process according to any one of claims 1–3 or 5, characterised in that the shaft of the stirrer and granulator is positioned horizontally.

7. A process according to any one of claims 1–3 or 5, characterised in that at least 30% and not more than 60% of the reaction vessel is filled.

8. A process according to any one of claims 1–3 or 5, characterised in that terephthaloyl dichloride is added at a rate of at least 4.5 kg/min per m$^3$ of reaction vessel content and not more than 72 kg/min per m$^3$ of reaction vessel content.

9. A process according to any one of claims 1–3 or 5, characterised in that the terephthaloyl dichloride is added in the liquid form.

10. A process according to any one of claims 1–3 or 5, characterised in that the temperature of the contents of the reaction vessel prior to the addition of the terephthaloyl dichloride is above 0° C. and below 10° C.

11. A process according to claim 2, characterised in that the preparation is carried out in a reaction vessel having a measure of capacity of at least 0.25m$^3$.

* * * * *